April 24, 1934.    J. E. WYATT    1,956,186
COMBINATION GRASS PLOW AND CULTIVATOR
Filed Aug. 31, 1933    2 Sheets-Sheet 2
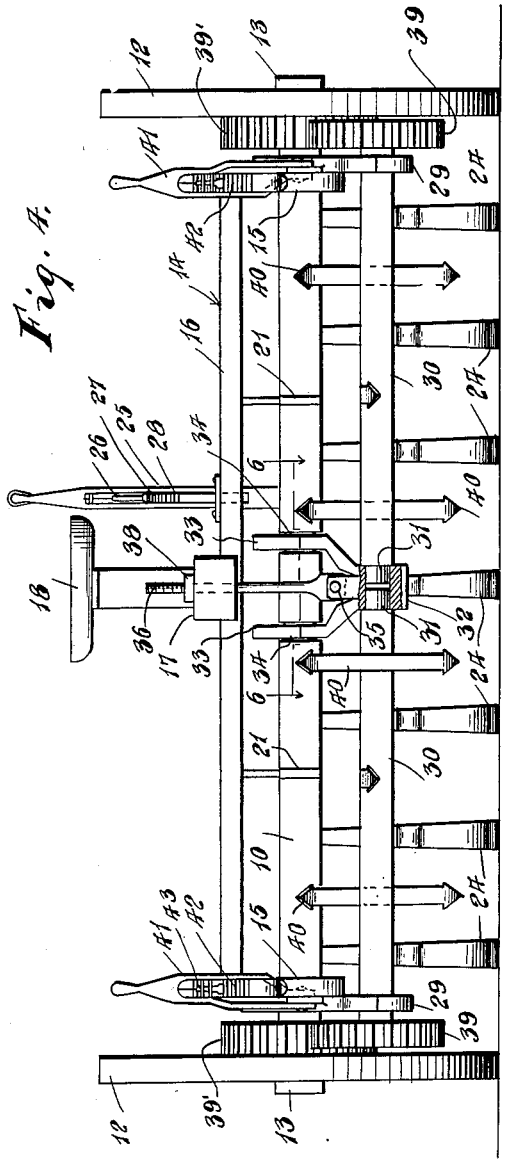
Inventor
J. E. Wyatt.
By L. F. Kendrick, Jr.
Attorney Patented Apr. 24, 1934

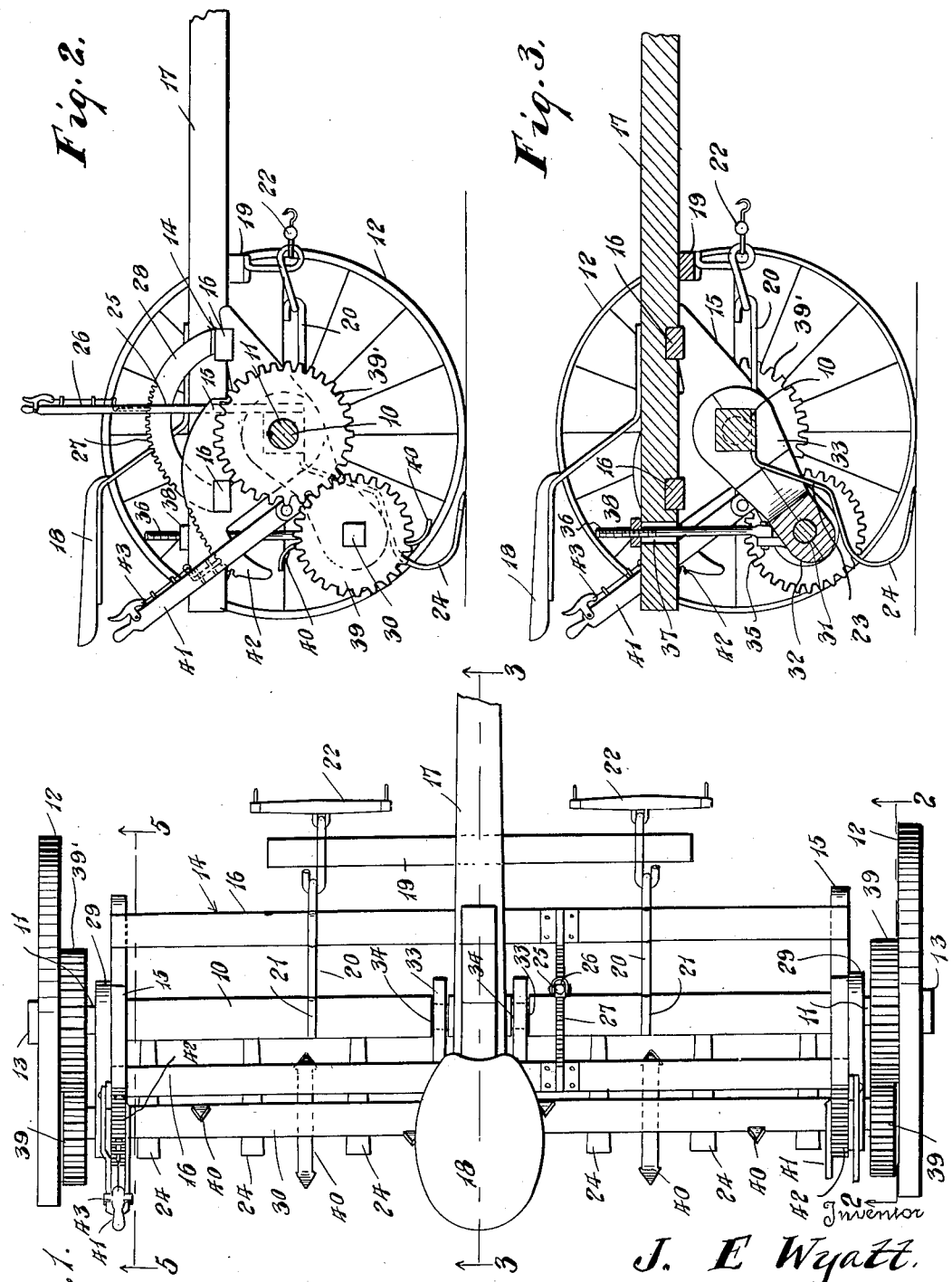

1,956,186

UNITED STATES PATENT OFFICE 1,956,186

COMBINATION GRASS PLOW AND CULTIVATOR

James E. Wyatt, Sulphur Springs, Tex.

Application August 31, 1933, Serial No. 687,708

5 Claims. (Cl. 97—40)

This invention relates to an agricultural implement adapted for plowing and cultivating functions, and for example, for use in the plowing of all kinds of grass or sods, crushing and threshing the same, and throwing the grass behind the plow.

It is also aimed to provide such an implement as may be readily converted into a cultivator or pulverized.

The more specific objects and advantages will become apparent from a consideration of the description following taken in connection with accompanying drawings illustrating an operative embodiment.

In said drawings:—

Figure 1 is a plan view of the implement,

Figure 2 is a longitudinal sectional view taken on the line 2—2 of Figure 1,

Figure 3 is a longitudinal sectional view taken on the line 3—3 of Figure 1,

Figure 4 is a front elevation partly in section of the implement,

Figure 5 is a longitudinal sectional view taken on the line 5—5 of Figure 1,

Figure 6 is a horizontal sectional detail taken substantially on the line 6—6 of Figure 4, and Figure 7 is a detail sectional view taken on the line 7—7 of Figure 5.

Referring specifically to the drawings, the implement has a main beam at 10, rectangular in cross section, on round ends 11 of which ground wheels 12 are journaled, and removably secured in place as by nuts 13. A frame 14 is capable of pivotal movement on the beam 10 and is constructed as follows:

On each of said rounded portions 11 is pivoted a bracket 15 and the two brackets 15 are spanned by and rigid with cross bars 16 to which a draft pole or tongue 17 is rigidly fastened, and on the rear end of which a seat structure 18 is carried. A short cross bar 19 is connected to the pole 17 parallel to the bars 16 and bracing brackets 20 are journaled at 21 on rounded portions of the beam 10 and rigidly connected to the forward bar 16 and bar 19, suitable draft trees 22 being pivotally connected to the brackets.

Rigidly fastened to the beam 10 are a plurality of cultivator or equivalent teeth 23, such teeth extending downwardly and forwardly and having open, substantially horizontally disposed U-shaped terminals at 24. Beam 10 may be rotated relatively to the wheels 12 in order to vary the depth of penetration of the teeth 24, to which end a lever 25 rises therefrom, carrying a conventional latch mechanism 26 engageable with the teeth 27 of a bracket 28 secured to the bars 16.

Also pivoted on the round portions 11, outwardly of the brackets 15, are brackets 29 in which are journaled round portions of a pair of alined but independently operable beams 30. The inner end portions of such beams are journaled at 31, in a bearing 32, as best shown in Figure 4, said bearing being in the form of a lever having arms 33 pivoted on round portions 34 of the beams 10. Flexibly connected to the lever or bearing 32 at 35 is a rod 36 which extends loosely through an enlarged opening 37 in the draft tongue 17, and above which it has a nut 38 screw-threaded thereto. The nut 38 may be adjusted when desired to suspend the bearing 32 and adjacent end of the shaft or beam 30.

On the outer end of the beams 30, gear wheels 39 are keyed, which mesh with gear wheels 39' rigid with the ground wheels 12. The said beams 30 carry curved teeth 40 of the shape best shown in Figure 2.

In order to vary the elevation of the teeth 40 levers or rods 41 rise from each bracket 29 and have open portions straddling curved toothed racks 42. Said bars or levers 41 carry conventional latch means 43 which are engageable with the toothed racks 42 to secure the connected parts in adjusted position. Said racks 42 are integral rearward extensions of the brackets 15 as best shown in Figure 5.

The present implement is adapted for an all season use to serve as an all round grass plow, to pulverize the soil of clods and turf land, and discharge the grass rearwardly of the land or soil, since the teeth 40 alternate with the teeth 23. When it is desired to use the device as a cultivator, the brackets 29 can be removed, as well as all parts carried thereby, particularly the beams 30, geared thereon. Under these conditions in particular, the nut 38 is tightened in order to secure the bearing 32 in an elevated position.

It will be realized that inasmuch as the teeth 40 operate between the teeth 24 and the latter engage sod, the teeth 40 will engage the grass thereof throwing it rearwardly, and at the same time causing the dirt of the sod to be pulverized.

Inasmuch as the shafts 30 are independently rotatable, the device is able to turn more readily, the plurality of beams giving a differential action.

Various changes may be resorted to, provided they fall within the spirit and scope of the invention as defined by appended claims.

I claim as my invention:—

1. An agricultural implement of the class described, comprising a draft frame, a rectangular beam journaled on said frame, ground wheels journaled on opposite ends of said frame, spaced teeth secured to said beam and depending therefrom, an adjusting lever secured to said beam and cooperating with said frame to raise and lower said teeth by rotation of the beam, auxiliary beams, means pivotally mounted on the first-mentioned beam and mounting the auxiliary beams for rotation, gearing driven by said ground wheels and operatively connected to said auxiliary beams to rotate them, and means to adjust the auxiliary beams relatively to the first mentioned teeth.

2. A machine of the class described, comprising a draft frame, a rectangular beam journaled on said frame, ground wheels journaled on opposite ends of said beam, spaced teeth secured to said beam and depending therefrom, an adjusting lever secured to said beam and cooperating with said frame to raise and lower said teeth by rotation of the beam relatively to the wheels, gearing driven by said ground wheels, auxiliary beams rotated by said gearing, brackets pivotally mounted on the rectangular beam and journaling said auxiliary beams, teeth secured to said auxiliary beams and operable between the first mentioned teeth, and means to adjust said brackets and auxiliary beams to adjust the positions of the teeth thereon relatively to the first mentioned teeth and independently thereof.

3. An implement of the class described having a beam, ground wheel means journaled on said beam, teeth depending from the beam, brackets journaled on the beam, auxiliary beams journaled in the said brackets, gearing driven from the wheels to drive said auxiliary beams, a bearing bracket journaled on the first mentioned beam in which the inner ends of the auxiliary beams are journaled, and teeth on the auxiliary beams operable intermediate the first mentioned beam, said auxiliary beams being removable, and means to secure the bearing in elevated position when the auxiliary beams are removed.

4. An implement of the class described having a main beam, ground wheels journaled thereon, teeth depending from said beam, brackets journaled on said beam, means carried by the brackets provided with teeth operable intermediate the first mentioned teeth, gearing to drive the said means from the ground wheels, a draft frame having a bracket journaled on said beam, the last mentioned bracket having racks, and means operable to vary the last mentioned teeth engageable with said racks.

5. An implement of the class described having a main beam, ground wheels journaled thereon, teeth depending from said beam, brackets journaled on said beam, means carried by the brackets provided with teeth operable intermediate the first mentioned teeth, gearing to drive the said means from the ground wheels, a draft frame having a bracket journaled on said beam, the last mentioned bracket having racks, means operable to vary the last mentioned teeth engageable with said racks, a rack on the frame, and means operable to rotate the beam to vary the depth of the teeth thereon, said last mentioned means being adapted for locking to said last mentioned rack.

JAMES E. WYATT.